No. 632,754.　　　　　　　　　　　　Patented Sept. 12, 1899.
J. J. ROYLE.
STEAM TRAP.
(Application filed Apr. 3, 1899.)

(No Model.)　　　　　　　　　　　　2 Sheets—Sheet 1.

WITNESSES
L. C. Dyer
E. E. Clark

INVENTOR
John James Royle
By C. J. Belt
Atty.

No. 632,754. Patented Sept. 12, 1899.
J. J. ROYLE.
STEAM TRAP.
(Application filed Apr. 3, 1899.)
(No Model.) 2 Sheets—Sheet 2.
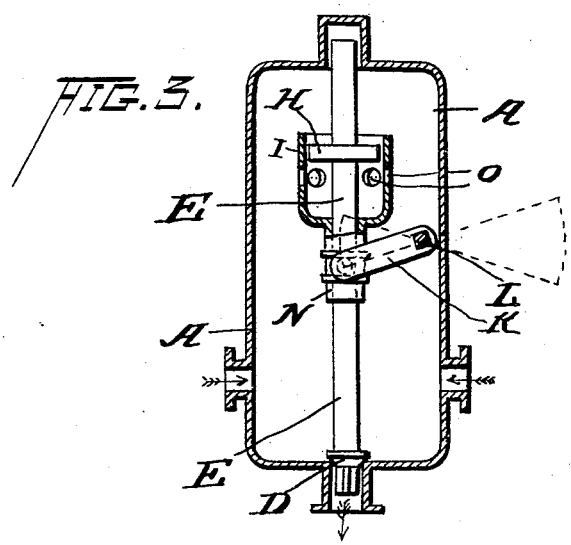
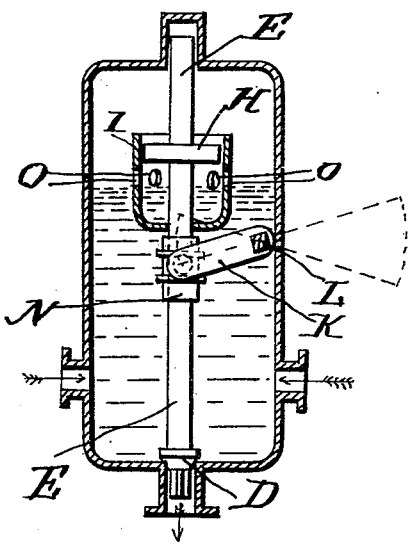
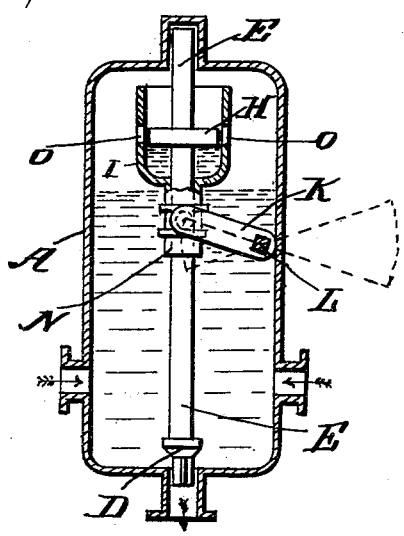
Witnesses
L. C. Dyer
E. E. Clark
Inventor
John James Royle
By C. J. Belt,
Attorney

UNITED STATES PATENT OFFICE.

JOHN JAMES ROYLE, OF MANCHESTER, ENGLAND.

STEAM-TRAP.

SPECIFICATION forming part of Letters Patent No. 632,754, dated September 12, 1899.

Application filed April 3, 1899. Serial No. 711,566. (No model.)

*To all whom it may concern:*

Be it known that I, JOHN JAMES ROYLE, a subject of the Queen of Great Britain and Ireland, and a resident of Manchester, England, have invented certain Improvements in Steam-Traps, of which the following is a specification.

In the construction of steam-traps for very high pressure there are practical difficulties—first, from the high steam-pressure which precludes the use of hollow floats for operating the valve, and, second, from the high temperature of the water of condensation, which operates against its quick ejectment. In order to overcome these difficulties, I propose to work the outlet-valve by mechanism within the trap operated from an outside source and which is only allowed to operate on the valve when the water has reached a certain height. One method of carrying this into effect would be to employ a cylinder and piston, of which the piston is connected to the valve of the trap. The cylinder is given a slow reciprocating movement from the outside of the trap and is provided with ports or passages opening on each reciprocation to the body of the trap. As long as the trap is free of water the piston will move freely in the cylinder, leaving the valve of the trap closed; but as soon as the water in the trap reaches the cylinder and floods it (through the ports or passages before mentioned) a body of water is thereby interposed and the piston on the next reciprocation is lifted, so opening the valve of the trap and allowing the water of condensation to escape. This lifting action will continue so long as the height of water in the trap is sufficient to flood the cylinder.

Figure 1:
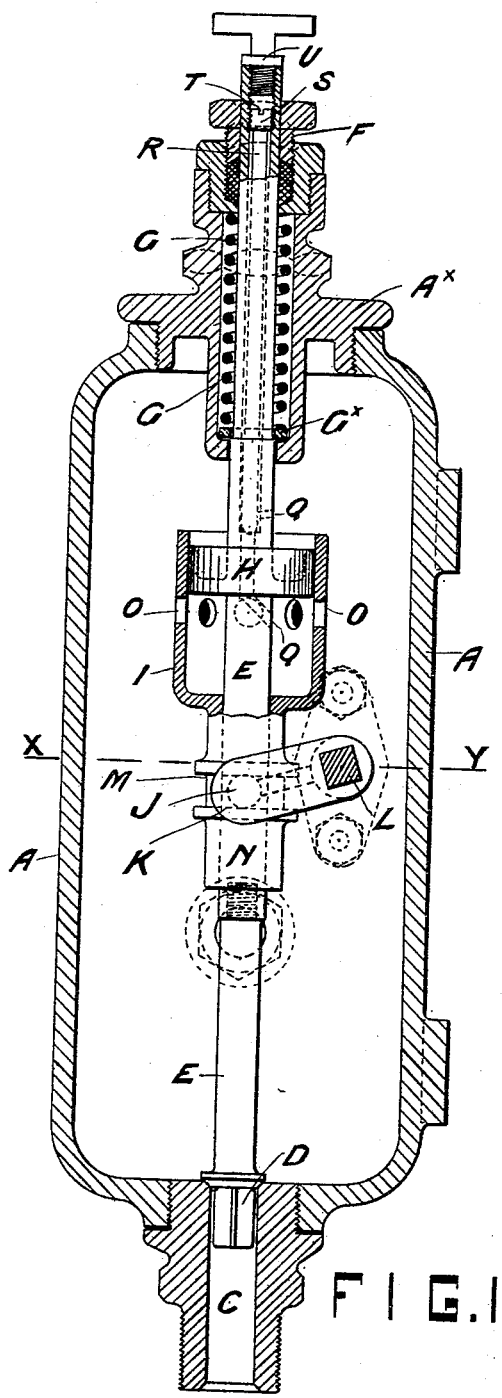
Figure 2:
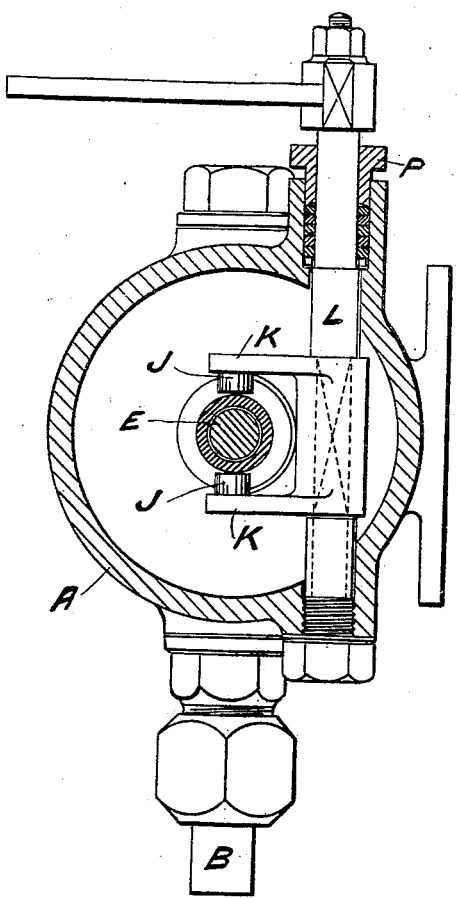

On the annexed drawings, Figure 1 illustrates a vertical section, and Fig. 2 a horizontal section on line $x\ y$, of a steam-trap constructed in accordance with my invention. Figs. 3, 4, and 5 illustrate diagrammatic sections of the trap for the purpose of demonstrating the action of the trap.

A is the outer casing or body of the trap, in which the water of condensation or priming drains through inlet-opening B.

C is the discharge-outlet controlled by valve D, and such valve is carried by a spindle E, which extends upward and passes through the cover $A^\times$ of the casing A to put the valve wholly or partially in equilibrium and where it is suitably packed by gland F and surrounded by spring G and flange $G^\times$ for giving the valve D a preponderance of pressure downward upon its seating. Upon such spindle I fix a piston H at, by preference, the position shown in Fig. 1, and also upon the spindle and surrounding such piston I mount a cylinder or cup I, capable of sliding up and down the spindle and sustained in position by pins J on arms K of rock-shaft L engaging with groove M in the extension or boss N. The cylinder or cup is formed with ports or openings O. Constant reciprocating motion is imparted to the cup I by means of rock-shaft L, which passes to the outside of the trap through gland P and is there connected to any suitable motor. In the spindle E is a by-pass Q.

The action of the trap in discharging water of condensation is as follows: Water enters the trap through inlet-opening B and collects in the trap until its level reaches and exceeds the level of the openings O and floods the interior of the cup I. Previously to being flooded the cup, owing to the by-pass Q, has no effect upon the piston H, but immediately the water intervenes the impact of the cup upon the water and the water upon the piston causes the spindle E to be lifted and with it the valve D, which thereby uncovers the outlet C and allows the water to be discharged. The lifting will continue stroke for stroke so long as the water overflows the cup; but as soon as the water falls below the openings O the leakage of the piston and by-pass allows the interposed water to gradually escape and the lifting action ceases until the cup is again flooded.

In Fig. 3 I show the position of the parts previous to the water entering the trap.

In Fig. 4 I show the water on the point of flooding the cup, and in Fig. 5 I show how the interposition of the water between the cup and piston causes the spindle to rise and lift the valve D.

In lieu of imparting motion to the cup I may impart motion to the piston. For affording a nicety of action the by-pass Q is controlled by spindle R, inclosed within spindle E and formed with screw-head S, having nick T for regulating purposes, and the cavity of the spindle is closed by plug U.

What I claim, and desire to secure by Letters Patent, is—

1. In an apparatus for discharging water of condensation or priming, from a steam apparatus, a casing, a valve controlling the outlet from the casing, a cup reciprocated continuously from the exterior of the casing, and a piston on the stem of said valve, adapted to be received by the said cup.

2. In combination, a casing or vessel for receiving water of condensation, inlet and outlet openings, a valve for controlling said outlet, a spindle connected with said valve, a piston fixed on said spindle, a cup or cylinder with openings or ports loosely mounted upon said spindle and surrounding the piston, and means for imparting reciprocating motion to said cylinder, as set forth and for the purposes described.

In witness whereof I have hereunto set my hand in the presence of two witnesses.

JOHN JAMES ROYLE.

Witnesses:
WALTER GUNN,
ARTHUR GRESTY.